United States Patent
Hartmann

(10) Patent No.: US 9,815,243 B2
(45) Date of Patent: Nov. 14, 2017

(54) DEVICE FOR PRODUCING THREE-DIMENSIONAL MODELS

(71) Applicant: VOXELJET AG, Friedberg (DE)

(72) Inventor: Andreas Dominik Hartmann, Stadtbergen (DE)

(73) Assignee: VOXELJET AG, Friedberg (DE)

(*) Notice: Subject to any disclaimer, the term of this patent is extended or adjusted under 35 U.S.C. 154(b) by 16 days.

(21) Appl. No.: 14/929,922

(22) Filed: Nov. 2, 2015

(65) Prior Publication Data

US 2016/0052166 A1  Feb. 25, 2016

Related U.S. Application Data

(62) Division of application No. 13/634,099, filed as application No. PCT/DE2011/000343 on Mar. 29, 2011, now Pat. No. 9,333,709.

(30) Foreign Application Priority Data

Mar. 31, 2010  (DE) .................. 10 2010 013 732

(51) Int. Cl.
*B29C 67/00* (2017.01)
*B28B 13/02* (2006.01)
(Continued)

(52) U.S. Cl.
CPC .......... *B29C 67/0081* (2013.01); *B05C 19/04* (2013.01); *B05C 19/06* (2013.01);
(Continued)

(58) Field of Classification Search
None
See application file for complete search history.

(56) References Cited

U.S. PATENT DOCUMENTS 3,291,233 A  12/1966  Mayer
3,762,014 A  10/1973  Klein
(Continued)

FOREIGN PATENT DOCUMENTS

AU  720255 B2  5/2000
DE  3221357 A1  12/1983
(Continued)

OTHER PUBLICATIONS

US 4,937,420, 06/1990, Deckard (withdrawn)
(Continued)

*Primary Examiner* — Binu Thomas
(74) *Attorney, Agent, or Firm* — The Dobrusin Law Firm, P.C.

(57) ABSTRACT

The present invention relates to a device for manufacturing three-dimensional models by means of a 3D printing process, whereby a build platform for application of build material is provided and a support frame is arranged around the build platform, to which said support frame at least one device for dosing the particulate material and one device for bonding the particulate material is attached via the guiding elements and the support frame is moveable in a Z direction, which essentially means perpendicular to the base surface of the build platform. In so doing, the device provides a material feeding device having a particle material container to supply particulate material in batches from the storage area to the dosing apparatus and to do so with the least possible amount of shearing forces and without significant interaction with the atmosphere.

22 Claims, 5 Drawing Sheets

Figure 1:
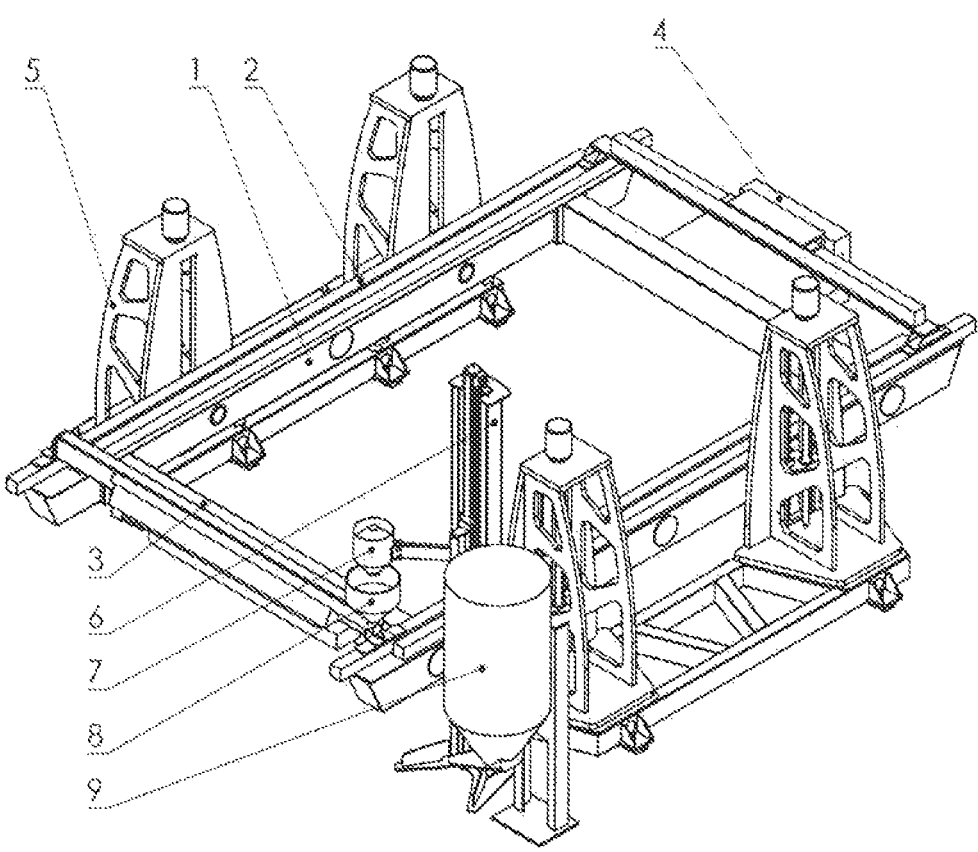

(51) Int. Cl.
- B05C 19/06 (2006.01)
- B05C 19/04 (2006.01)
- B29C 31/02 (2006.01)
- B33Y 30/00 (2015.01)
- B28B 1/00 (2006.01)
- B33Y 10/00 (2015.01)
- B22F 3/105 (2006.01)
- B05C 11/02 (2006.01)
- B22F 3/00 (2006.01)
- B33Y 40/00 (2015.01)
- B29K 105/00 (2006.01)

(52) U.S. Cl.
CPC ............ B28B 1/001 (2013.01); B28B 13/022 (2013.01); B29C 31/02 (2013.01); B29C 67/0051 (2013.01); B29C 67/0077 (2013.01); B33Y 10/00 (2014.12); B33Y 30/00 (2014.12); B05C 11/023 (2013.01); B22F 3/008 (2013.01); B22F 3/1055 (2013.01); B22F 2003/1056 (2013.01); B29K 2105/251 (2013.01); B33Y 40/00 (2014.12)

(56) References Cited

U.S. PATENT DOCUMENTS

| | | |
|---|---|---|
| 3,913,503 A | 10/1975 | Becker |
| 4,247,508 A | 1/1981 | Housholder |
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 9/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,055 A | 11/1996 | Melling et al. |
| 5,582,231 A | 12/1996 | Siak et al. |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,960 A | 11/1998 | Lewis et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,116,517 A | 9/2000 | Heinzl et al. |
| 6,120,231 A | 9/2000 | Christ et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 11/2001 | Elvidge et al. |
| 6,318,418 B1 | 11/2001 | Grossmann et al. |
| 6,322,728 B1 | 11/2001 | Brodkin et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |
| 6,476,122 B1 | 11/2002 | Leyden |
| 6,485,831 B1 | 11/2002 | Fukushima et al. |

(56) References Cited

U.S. PATENT DOCUMENTS

| | | |
|---|---|---|
| 6,500,378 B1 | 12/2002 | Smith |
| 6,554,600 B1 | 4/2003 | Hofmann et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höchsmann et al. |
| 7,807,077 B2 | 10/2010 | Ederer et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnüchtel et al. |
| 2001/0045678 A1 | 11/2001 | Kubo et al. |
| 2001/0050031 A1 | 12/2001 | Bredt et al. |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1* | 12/2005 | Russell .............. B29C 67/0081 264/308 |
| 2006/0159896 A1 | 7/2006 | Pfeifer et al. |
| 2006/0175346 A1* | 8/2006 | Ederer .............. B29C 67/0077 118/303 |
| 2006/0208388 A1 | 9/2006 | Bredet et al. |
| 2006/0251535 A1 | 11/2006 | Pfeifer et al. |
| 2006/0254467 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0215020 A1 | 9/2007 | Miller |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0241404 A1 | 10/2008 | Allaman et al. |
| 2009/0011066 A1 | 1/2009 | Davidson et al. |
| 2009/0068376 A1 | 3/2009 | Philippi et al. |
| 2010/0007062 A1 | 1/2010 | Larsson |
| 2010/0031882 A1* | 2/2010 | Abe .............. B29C 67/0077 118/620 |
| 2010/0207288 A1 | 8/2010 | Dini |
| 2010/0212584 A1 | 8/2010 | Ederer et al. |
| 2010/0243123 A1 | 9/2010 | Ederer |
| 2010/0247742 A1 | 9/2010 | Shi et al. |
| 2010/0279007 A1 | 11/2010 | Briselden et al. |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |

(56) References Cited

U.S. PATENT DOCUMENTS

| | | |
|---|---|---|
| 2012/0046779 A1 | 2/2012 | Pax et al. |
| 2012/0126457 A1 | 5/2012 | Abe et al. |
| 2013/0004610 A1 | 1/2013 | Hartmann et al. |
| 2013/0189434 A1 | 7/2013 | Randall et al. |
| 2014/0048980 A1 | 2/2014 | Crump et al. |
| 2014/0202381 A1 | 7/2014 | Ederer |
| 2014/0271961 A1 | 9/2014 | Khoshnevis |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grasegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |

FOREIGN PATENT DOCUMENTS

| | | |
|---|---|---|
| DE | 3930750 C2 | 3/1991 |
| DE | 4102260 A1 | 7/1992 |
| DE | 4305201 C1 | 4/1994 |
| DE | 4300478 | 8/1994 |
| DE | 4 325 573 | 2/1995 |
| DE | 29506204.5 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19851224 C1 | 5/2000 |
| DE | 19853834 | 5/2000 |
| DE | 19928245 A1 | 1/2001 |
| DE | 20107262 U1 | 8/2001 |
| DE | 10224981 B4 | 8/2004 |
| DE | 69634921 T2 | 12/2005 |
| DE | 201 22 639 U1 | 11/2006 |
| DE | 10 2006 040 305 A1 | 3/2007 |
| DE | 102005056260 A1 | 6/2007 |
| DE | 102006029298 A1 | 12/2007 |
| DE | 102006030350 A1 | 1/2008 |
| DE | 102006055326 A1 | 5/2008 |
| DE | 202009000825 U1 | 3/2009 |
| DE | 102007050679 A1 | 4/2009 |
| DE | 102011053205 A1 | 3/2013 |
| DE | 102015006363 A1 | 12/2016 |
| EP | 0361847 B1 | 4/1990 |
| EP | 361847 B1 | 4/1990 |
| EP | 0431324 B1 | 2/1994 |
| EP | 0431924 B1 | 1/1996 |
| EP | 0644809 B1 | 7/2001 |
| EP | 1415792 | 5/2004 |
| EP | 1872928 A1 | 1/2008 |
| JP | S62275734 A | 11/1987 |
| JP | 2003136605 A | 5/2003 |
| JP | 2004082206 A | 3/2004 |
| JP | 2009202451 A | 9/2009 |
| WO | 00/78485 A2 | 12/2000 |
| WO | 01/40866 A2 | 6/2001 |
| WO | 01/78969 A2 | 10/2001 |
| WO | 01/96048 A1 | 12/2001 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 2004/010907 A1 | 2/2004 |
| WO | 2004/014637 A1 | 2/2004 |
| WO | 2005/097476 A2 | 5/2005 |
| WO | 2005/082603 A1 | 9/2005 |
| WO | 2005/113219 A1 | 12/2005 |
| WO | 2007/039450 A1 | 4/2007 |
| WO | 2008/049384 A1 | 5/2008 |
| WO | 2008061520 A2 | 5/2008 |
| WO | 2011063786 A1 | 6/2011 |
| WO | 2011/124204 A1 | 10/2011 |
| WO | 2013075696 A1 | 5/2013 |
| WO | 2014090207 A1 | 6/2014 |
| WO | 2014166469 A1 | 10/2014 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015078430 A1 | 8/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

Cima et al., "Computer-derived Microstructures by 3D Printing: Bio- and Structural Materials," SFF Symposium, Austin, TX, 1994.
Sachs et al., "Three-Dimensional Printing: Rapid Tooling and Prototypes Directly from a CAD Model", Massachusetts Institute of Technology, pp. 131-136.
Sachs et al., "Three-Dimensional Printing: Rapid Tooling and Prototypes Directly from a CAD Model", Massachusetts Institute of Technology, pp. 143 & 151, Jan. 1990.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal, Apr. 2000.
Williams, "Feasibility Study of Investment Casting Pattern Design by Means of Three Dimensional Printing", Department of Mechanical Engineering, pp. 2-15, Jun. 1987.
Gephart, Rapid Prototyping, pp. 118-119, 1996.
Marcus et al., Solid Freeform Fabrication Proceedings, Nov. 1993.
Marcus, et al., Solid Freeform Fabrication Proceedings, Sep. 1995, p. 130-33.
International Search Report, Application No. PCT/DE2011/000343, dated Jul. 29, 2011, published as WO2011/124204A1.
International Preliminary Report on Patentability, Application No. PCT/DE2011/000343, dated Oct. 2, 2012.
German Office Action dated May 28, 2013, Application No. 102010013732.4.
EOS Operating Manual for Laser Sintering Machine with Brief Summary, dated Feb. 22, 2005.

* cited by examiner

DEVICE FOR PRODUCING THREE-DIMENSIONAL MODELS

CROSS-REFERENCE TO RELATED APPLICATIONS

The present application is a Divisional of U.S. patent application Ser. No. 13/634,099, filed on Sep. 11, 2012 (patented as U.S. Pat. No. 9,333,709 B2 on May 10, 2016), which is a national phase filing under 35 USC §371 from PCT Application PCT/DE2011/000343 filed on Mar. 29, 2011 and published as WO2011/124204 A1 and claiming priority to German Patent Application DE 10 2010 013732.4 filed on Mar. 31, 2010. The present application claims the benefit of priority of U.S. patent application Ser. No. 13/634,099, PCT Application PCT/DE2011/000343, and German Patent Application DE 10 2010 013732.4. This patent application is also related to U.S. patent application Ser. No. 14/929,867 filed on Nov. 2, 2015, which is a continuation patent application of U.S. patent application Ser. No. 13/634,099.

The invention relates to a device for manufacturing three-dimensional models by a 3D printing method as expressed in the generic concept of patent claim 1 and a method for manufacturing three-dimensional models by a 3D printing method according to patent claim 8.

A method for producing three-dimensional objects from computer data is described in the European patent specification EP 0 431 924 B1. In this method, a particulate material is deposited in a thin layer onto a platform which, if needed, is surrounded by a chamber and then a binder material is selectively printed on the particulate material using a print head according to computer data. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas.

The object produced from the solidified particulate material is embedded in loose particulate material as described above and such is subsequently removed therefrom. This is done, for example, using an extractor. This leaves the desired objects, from which the remaining powder is removed, e.g. by brushing.

Other powder-supported rapid prototyping processes work in a similar manner, for example, selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods".

It is known from the prior art of DE 102 24 981 B4 of another 3D printing method particularly for building casting patterns. In this method, a particulate material, e.g. quartz sand, is mixed with liquid hardener and deposited in a thin layer onto a build platform. A liquid binder is subsequently dosed over selected areas and this binder reacts with the hardener, thereby causing the desired areas of the particulate material to solidify. After multiple repetitions of this process, an individually formed body can be created from the bonded particulate material. This body is initially embedded in the surrounding, unbonded particulate material and can be removed from the particle bed following completion of the building process.

With all the aforementioned 3D printing methods, the provision of a build container with the vertically lowerable build platform located within requires a high technical effort in respects to sealing of the chamber wall against the platform to prevent the particulate material from uncontrollably flowing out through the gap between the edge of the build platform and the chamber wall, otherwise the danger exists that the platform will jam against the chamber wall due to the possibly grainy particulate material.

Another disadvantage of the lowerable build platform is the constantly increasing weight on the build platform to be moved as the building process progresses. In particular during application of the new layer, it may be necessary to lower the powder bed by more than the layer thickness and then raise it again to the dimension required in order to adjust the layer thickness with sufficient accuracy. In the case of such a revolving operation, not only the total weight of the powder feedstock including the build platform must be overcome, but also the frictional forces of the powder bed relating to the chamber walls and the seal friction between the build platform and chamber wall. This results in high loads for the guides and drives, especially when dealing with large build spaces and high feedstock thicknesses of the particulate material employed.

In this regards it is known from the prior art of EP 0 644 809 81 and DE 10 2006 030 350 A1 of a method whereby the particle bed is not lowered relatively to the worktable, but rather the coating apparatus and the print head used for applying the particulate material and binder are raised relative to the particle bed. Thus it is known from the prior art that a coater for particulate material and a print head are attached to a support frame and thereupon arranged.

This type of 3D printing system is preferably employed for manufacturing relatively large and heavy mouldings. Large quantities of particulate material are needed for such systems and if the system is preloaded with this material, then it loads the support frame with heavy additional weight, at least at the beginning of the process. The big advantages of the system for vertically moving constant loads would be lost in this scenario. Therefore, the particulate material is preferably stationary, stored next to the system, and then supplied to the coating apparatus. However, a difficulty arises concerning how to convey the particulate material to the level of the coating apparatus, which is constantly changing during the building process. The methods used by other 3D printing systems to convey particulate material are not suitable for this purpose.

For example, it is suggested in DE 201 07 262 U1 to use a spiral conveyor to move particulate material from a large system-external storage silo and supply it to a smaller storage silo situated in the 3D printing system itself. However, spiral conveyors require relatively large turning radii when negotiating changes in direction and only permit small elastic deformations when in operation. That is why the conveyor line can be relatively long (depending on the system size). This results in large quantities of particulate material that are required to "prime" the conveyor line before the material arrives at the coater. If it is necessary to switch to a different particulate material, then this material must be reconveyed back to the storage silo.

If, for example, the particulate material is mixed with the liquid hardening components prior to the printing order run and the moisture content of this mixture must be maintained as uniform as possible, then a spiral conveyor is eliminated as an option due to the fact that conveying spirals generate frictional heat during operation and this heat, in conjunction with the large air volumes in the system plus constant turning-over of the particulate material surface, dries out the particulate material. Moreover, curved spiral conveyor systems are not able to convey material lying external to their radii. The particulate material builds up at these areas and forms deposits. These deposits can grow until they precipitate out as clumps, which are then fed to the coater and this, in turn, tends to cause breakdowns. In order to prevent this, the spiral conveyor must be regularly disassembled and cleaned. The time and cost expense of such actions increases in proportion to the conveyor line length.

If, for instance, sand is used as the particulate material, then the service life of a spiral conveyor system will be limited due to the fact that the transport of sand entails friction, which causes the sand to be highly abrasive. Furthermore, the abrasion of the conveyor spiral can impact negatively on the process.

If the particulate material is conveyed to the uppermost position and then supplied via a drop-out to the coater, then a portion of the mixed-in liquid medium may evaporate. The flow characteristics of the particulate material mixture are thereby modified. Since the vertical location of the coater is constantly changing during the process, this means that the flow behaviour of the particulate material mixture is also constantly changing.

Pneumatic conveyors are also ruled out for similar reasons since these would likewise subject the particulate material to high wind currents and thereby desiccate it in an uncontrolled way.

Therefore, one of the objects of the invention Is to provide both a device for the described 3D printing system and a method which enables supply of adequate quantities of particulate material to the coater during object-building and in a fashion that is both simple and that involves the least amount of interaction with the atmosphere.

This object is achieved by a device according to patent claim 1 and a method according to patent claim 8.

One method related aspect of the invention is directed to a method for manufacturing three-dimensional models using a 3D printing process including the steps of transporting a first amount of a particulate material from a stationary material storage device to a first vertical position using a material feeding device for delivering the particulate material to a receiving container that is attached to a support frame so that the receiving container moves with the support frame in a vertical direction; b) filling a dosing unit on the support frame with the particulate material in the receiving container; c) depositing one or more layers of the particle material from the dosing unit onto a stationary build platform; d) elevating the support frame, the dosing unit, and the receiving container in the vertical direction after depositing each layer of the particulate material by one particle layer thickness; and e) transporting a second amount of the particulate material from the material storage device to a second vertical position using the material feeding device for delivering the particulate material to the receiving container; where the second vertical position is offset from the first vertical position; and the method includes mixing the particulate material with a liquid prior to transporting the particulate material from the material storage device.

Another method related aspect of the invention is directed to a method for manufacturing three-dimensional models using a 3D printing process including the steps of: transporting a first amount of a particulate material from a stationary material storage device to a first vertical position using a material feeding device for delivering the particulate material to a receiving container that is attached to a support frame so that the receiving container moves with the support frame in a vertical direction; filling a dosing unit on the support frame with the particulate material in the receiving container; depositing one or more layers of the particle material from the dosing unit onto a stationary build platform; elevating the support frame, the dosing unit, and the receiving container in the vertical direction after depositing each layer of the particulate material by one particle layer thickness; and transporting a second amount of the particulate material from the material storage device to a second vertical position using the material feeding device for delivering the particulate material to the receiving container, where the second vertical position is offset from the first vertical position; where the dosing device is a coater device that moves over the build platform in a horizontal direction; the particulate material being transported by the material feeding device includes many individual particles that generally move together at the same instantaneous velocity, and are supported by one or more surfaces of the material feeding device and move with the support surface at the same instantaneous velocity.

Another method related aspect of the invention is directed to a method for manufacturing three-dimensional models using a 3D printing process including the steps of: transporting a first amount of a particulate material from a stationary material storage device to a first vertical position using a material feeding device for delivering the particulate material to a receiving container that is attached to a support frame so that the receiving container moves with the support frame in a vertical direction; filling a dosing unit on the support frame with the particulate material in the receiving container; depositing one or more layers of the particle material from the dosing unit onto a stationary build platform; elevating the support frame, the dosing unit, and the receiving container in the vertical direction after depositing each layer of the particulate material by one particle layer thickness; and transporting a second amount of the particulate material from the material storage device to a second vertical position using the material feeding device for delivering the particulate material to the receiving container, wherein the second vertical position is offset from the first vertical position; where the dosing device is a coater device that moves over the build platform in a horizontal direction; and the particulate material is mixed with a liquid medium prior to being deposited as a layer over the build surface.

Another method related aspect of the invention is directed to a method for manufacturing three-dimensional models using a 3D printing process comprising the steps of: transporting a first amount of a particulate material from a stationary material storage device to a first vertical position using a material feeding device for delivering the particulate material to a receiving container that is attached to a support frame so that the receiving container moves with the support frame in a vertical direction; filling a dosing unit on the support frame with the particulate material in the receiving container; depositing one or more layers of the particle material from the dosing unit onto a stationary build platform; elevating the support frame, the dosing unit, and the receiving container in the vertical direction after depositing each layer of the particulate material by one particle layer thickness; and transporting a second amount of the particulate material from the material storage device to a second vertical position using the material feeding device for delivering the particulate material to the receiving container, wherein the second vertical position is offset from the first vertical position; where the dosing device is a coater device that moves over the build platform in a horizontal direction; and the material feeding device has an incline angle, wherein the incline angle changes as the vertical position of the coater device is changed.

According to the present invention, a device for manufacturing three-dimensional models by means of a 3D printing process is described, whereby a build platform for application of build material is provided and a support frame is arranged around the build platform, to which said support frame at least one device for dosing the particulate material and one device for bonding the particulate material is attached via the guiding elements, and the support frame is moveable in a Z direction, which essentially means perpendicular to the base surface of the build platform. In so doing, the device according to the invention provides a material feeding device having a particle material container to supply particulate material in batches from the storage area to the dosing apparatus and to do so with the least possible amount of shearing forces and without significant interaction with the atmosphere.

One example of a device that can be used for bonding particulate material is a print head for dosing liquid droplets. When brought in contact with the particulate material, the liquid leads to locally confined bonding.

During the course of conveyance in batches of particulate material from a stationary silo to the dosing apparatus, the particulate material container of the device according to the invention has a certain return mechanism. According to a preferred embodiment of the invention, a batch contains less particulate material than is required for depositing all layers on the build platform. In such an embodiment of the invention, it is possible to reduce the weight of the coater.

Preferably, one batch should be sufficient to deposit at least one layer of particulate material to the build platform. In such an embodiment, the build process must not be interrupted until application of one particle layer is complete and this enables such to be implemented very accurately.

In particular, if the particular material container of the device according to the invention is vertically moveable, then filling of the coater can be carried out easily and without either loss or unnecessarily high air introduction.

If the particulate material container is moveable in the horizontal direction and/or pivotable, then it is feasible to fill the coater in various horizontal positions.

According to one particularly preferred embodiment of the present invention, the means for supplying has a chain trough conveyor and/or a conveyor belt.

The aforementioned object of the present invention is additionally achieved by provision of a method for manufacturing three-dimensional models using a 3D printing process comprising the following steps:
a) Depositing of one layer of particulate material from a dosing unit onto a stationary build platform;
b) Selective solidification of the particulate material by means of a bonding unit in accordance with one of the cross-sections corresponding to the model being manufactured;
c) Elevation of the dosing unit and, if required, the bonding unit by one particle layer thickness;
d) Repetition of steps a) to c) until the completed model Is achieved.

During the manufacturing process according to the invention, the particulate material is refilled into the height-variable dosing device via supply of particulate material from the storage area in batches to the dosing apparatus by means of a material feeding device with a particle material container.

According to a preferred embodiment of the invention, the particulate material is mixed with a liquid medium prior to the layer-by-layer processing. Mixing of the entire amount of particulate material required for the process can take place in a mixing device prior to introduction into the process. The material would be supplied from a stationary silo, the storage area, in batches to the coating apparatus depending on the process progress. This procedure has the advantage that the mixing device is not contained within the process chain and therefore a malfunction thereof does not directly affect the process flow. On the other hand, the particulate material must be elaborately protected from separation or volatilisation of the liquid medium.

For this reason, the material mixture is advantageously manufactured with a mixer during the running process. Batch mixers are preferentially suited for this purpose. The mixer is supplied with particulate material as required, e.g. via a pneumatic conveyor line. The mixer weighs the particulate material in a prespecified quantity in the mixing chamber and adds the liquid hardening medium as per the selected recipe. After a specified mixing time, the material mixture is transported to a storage container. The storage container has e.g. filling level sensors which, if lower than a certain set point, indicate to the mixer control to make up the next batch of particulate material mixture. The storage container additionally has an e.g. pneumatically actuated flap to use for emptying thereof.

This is opened when the conveying crucible is situated under the flap. In this case, the material mixture flows under gravity into the conveying crucible. The filling height is determined by e.g. an arrangement that seals on top of material cones. The conveying crucible is then transported by means of a linear actuator at the required level above the coating apparatus. The conveying crucible is emptied there in a receiving container. The particulate material mixture is transported from the filling point e.g. via a spiral conveyor and distributed across the width of the coater. The receiving container including the distribution mechanism can be transported transversally along with the coating apparatus. In this case, the coater needs to fill the receiving container and to do this, it must move to a defined transfer position below the conveying crucible. In a preferred embodiment, the receiving container, including the distribution mechanism, is permanently attached to the support frame and can therefore only move vertically with it. In turn, attached to the distribution mechanism is a dosing device that fills the coater with the particulate material mixture if its stock is exhausted. This has the advantage that the quantity of particulate material mixture that travels along with the coater is relatively small and therefore it exerts very small dynamic loads upon the support frame.

The coater can subsequently apply a thin layer of particulate material mixture onto a vertically positioned build plane. Next comes the bonding step e.g. with the aid of a print head that doses a liquid, via individually controlled nozzles, onto an area that corresponds to one of the cross-sections of the body being built. This liquid reacts with the particulate material mixture and bonds the particle in the desired area and/or results in additional bonding with the particulate material mixture layer possibly situated directly below it. After this, the support frame is elevated by a unit equal to the thickness of the layer currently being processed, a new layer is applied and then bonded according to the new cross-section data. The sequential process consisting of lifting, layer application and bonding will be repeated until the desired body is completed.

During this process, the coater travels multiple times to the receiving container to fill with fresh particulate material mixture that was prepared in several individual batches in the mixer and supplied to the receiving container via the conveyor line. As the process advances, the height of the structural body increases. While doing so, the vertical position of the support frame changes and consequently also the position of the receiving container. Correspondingly, the transfer position of the conveying crucible in the receiving container migrates upward in the vertical direction.

Lastly, the non-bonded particulate material is removed. To do this, the build plane is moved to a side and out of the device and another build plane is possibly moved into the device on the opposite side, so that the build process can be restarted while the previous structural body is freed from surrounding particulate material.

For the purpose of more detailed explanation, the invention is described in further detail below on the basis of preferred embodiments with reference to the drawing.

Figure 2A:
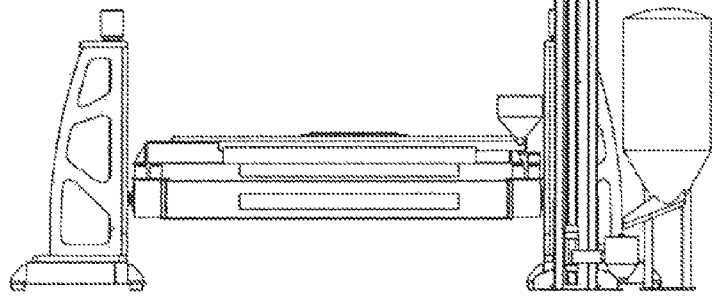
Figure 2B:
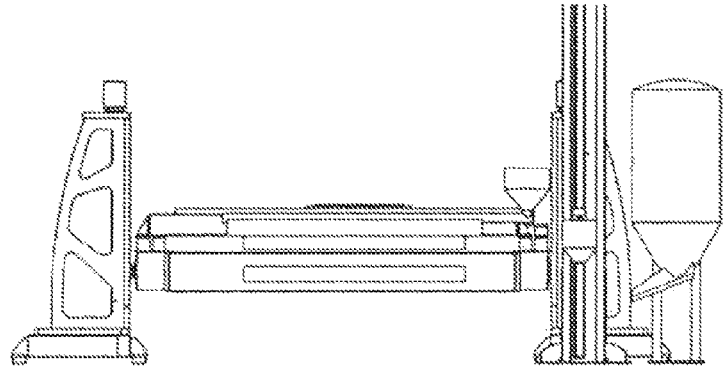
Figure 2C:
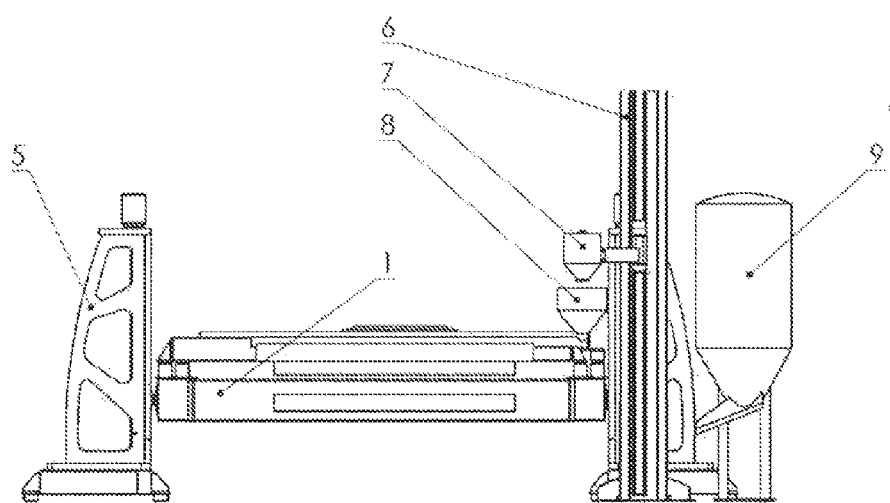
Figure 3A:
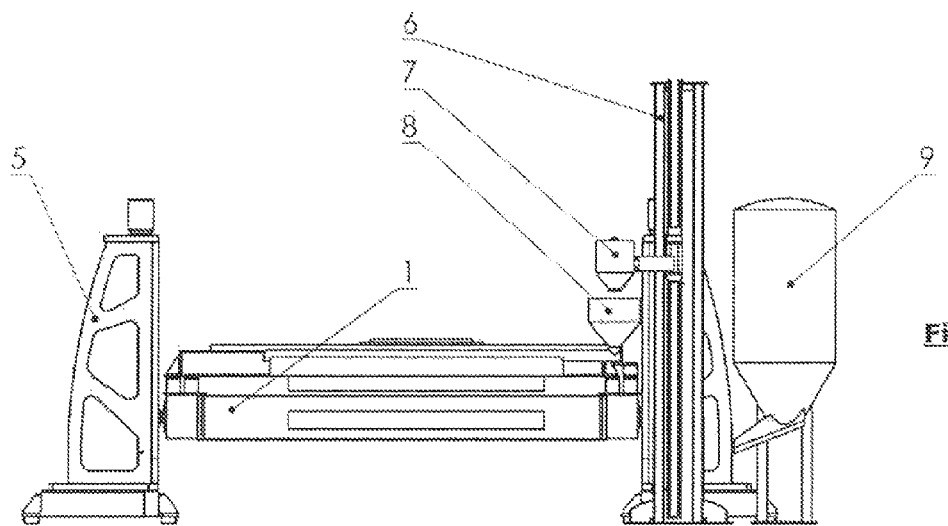
Figure 3B:
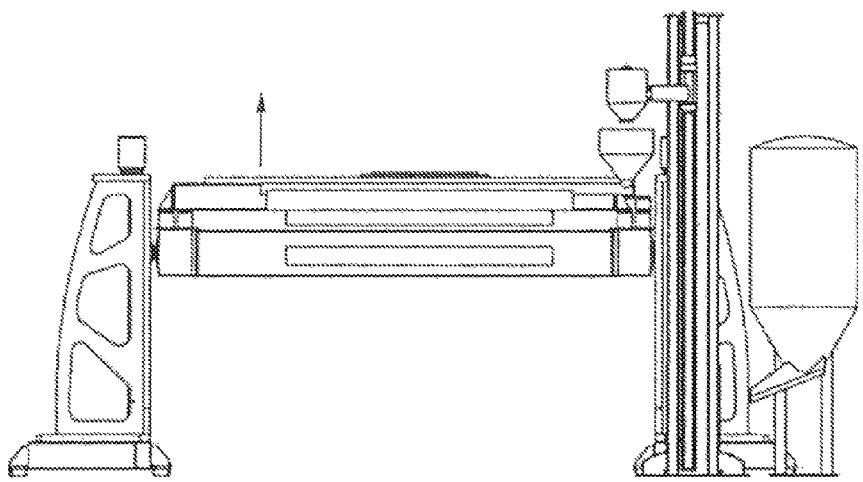
Figure 4:
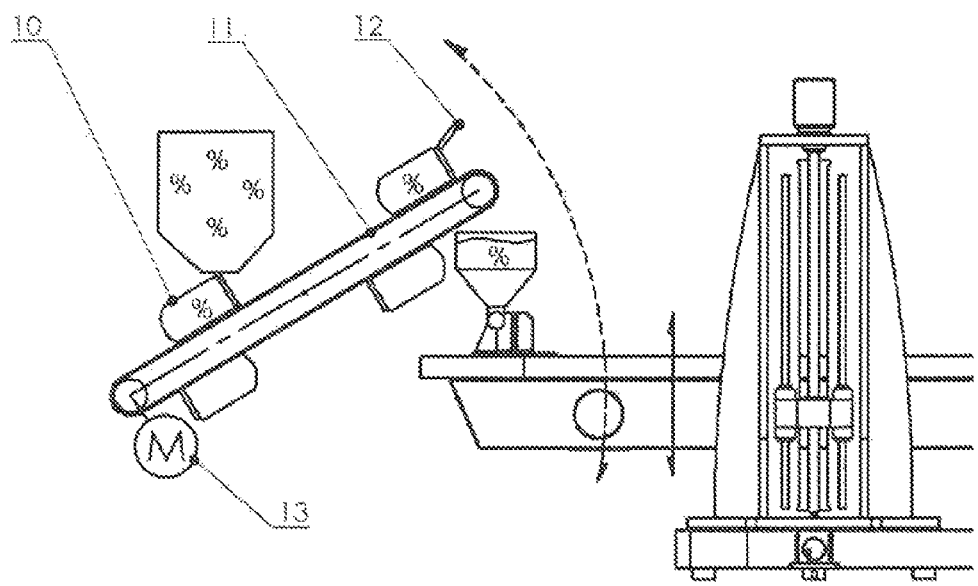
Figure 5:
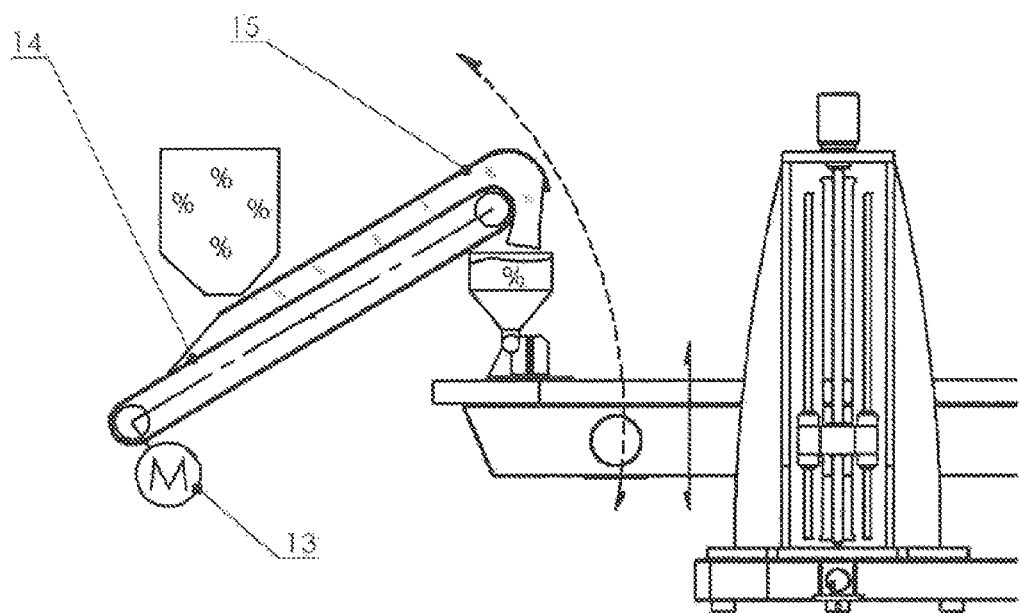

In the drawing:

FIG. 1 A spatial representation of one preferred embodiment of the present invention;

FIG. 2 *a*) to *c*) A side view of the device during various filling process steps during the build process;

FIG. 3 *a*) and *b*) Filling process steps at various filling heights of the support frame;

FIG. 4 A side-view representation of another device according to the invention with trough conveyor and closeable troughs; and FIG. 5 A side-view representation of another device according to the invention with trough conveyor and roofed-over conveyor belt.

FIG. 1 shows an isometric view as an application example of a device that can be used to manufacture 3D models. In addition to other features, this displayed preferred device has a support frame (1) that is moveable in the vertical direction and/or in the X direction by means of positioning units (5).

The support frame (1) carries the particle doser or coater (3) and the bonding unit, for example, a print head (4). The coater (3) and print head (4) can be moved over the length of the support frame (1). The space within the support frame (1) is the build space in which the models are built. The coater unit (3) and bonding unit (4) can access the entire build space.

The coater (3) is retained in its park position when the bonding unit (4) is located within a collision-endangering vicinity. When the coater (3) is located in park position, it can be filled with particulate material.

In a preferred embodiment of the invention, the coater (3) only carries enough particulate material for safely applying one layer of the build process. With such an embodiment, the coater (3) is reloaded after every applied layer with the appropriate particle quantity.

When depositing the next layer, the first step involves elevating the support frame (1) by one layer thickness in the vertical direction. When doing so, this also changes the refilling position of the coater (3).

FIG. 1 shows the refilling device for the coater (3) according to one preferred embodiment. As means for supplying, the refilling device has a lifting device (6), a conveying crucible (7) and a receiving container (8) as well as a storage area, respectively, a silo/mixer unit (9).

According to the invention, process-ready material can be dispensed at the outlet of the silo/mixer unit (9). In the preferred embodiment according to the invention shown in FIG. 2*a*, a vertically moveable lifting unit (6) brings a conveying crucible (7) under the outlet of the silo/mixer unit (9). After the conveying crucible (7) is filled, it is brought to the current height level of the support frame. Then it can be emptied into receiving container (8).

During transport of the particulate material, it continually comes in contact with the atmosphere, that is, with the oxygen of the air. The contact is essentially limited to the surface. If stricter demands need to be met in regards to the particulate material being used, then the conveying crucible (7) can be implemented as a closeable unit. In this context, it is likewise possible to additionally create artificial atmospheres in conveying crucible (7).

The travel time to the vertical height level at the given build heights can be neglected as long as the vapour pressure of the fluid applied over the particulate material is moderate.

Since the transport crucible (7) is small and always filled right away, no changes to the bulk material as a result of bonding/solidifications are anticipated. If bulk materials are used that exhibit such behaviour, then the process can be ideally adjusted to such because the behaviour is always the same due to the constant filling height.

After the material arrives in the receiving container (8), it is distributed over the length of the coater (3). Spiral conveyors can be used here. These are implemented with lengths that are just long enough to enable uniform filling of the entire coater (3) with particulate material. Selection of short spiral conveyors ensures that the particulate material is not negatively affected.

Depending on the build process, it may prove necessary to transport various particulate materials in the coater (3). For such purposes, the conveying crucible (7) can be alternatively provided with different materials from several silos/mixer units (9).

In terms of material transport, it is conceivable that systems with several conveying crucibles could be used, for example, chain trough conveyors or conveyor belts.

According to the preferred embodiment shown in FIGS. 1 and 2, the silo/mixer unit (9) has a low build height and the outlet is located considerably below the uppermost filling position. The conveying crucible is therefore not only vertically moveable, but additionally moveable in a second direction, horizontally.

An arrangement may also be provided that a silo/mixer unit (9) is suspended above the uppermost filling position. If such is done, then an additional movement direction is dispensed with. The conveying crucible (7) then brings the particulate material down to the receiving container (8). As with the previously described arrangement, it is likewise safeguarded against free fall and the atmosphere.

Both preferred embodiments also protect the support frame (1) from jolts due to powder material falling from great heights. It is easy to take support frame (1) design considerations into account since the low "fall height" remains constant.

Equally preferable are embodiments in which multiple refilling devices are employed. These may prove necessary if material requirements increase.

According to the invention, other transport mechanisms can also be used that enable variable filling heights of the coater, operate batch-wise and thereby only create low free fall heights.

FIG. 3 depicts the filling process at various vertical locations of the support frame. FIG. 2 shows the filling process by itself.

FIG. 4 shows a device according to the invention that utilises a trough chain conveyor as a supply means. In this case, several troughs (10) are attached to a chain (11). They are filled at the silo/mixer unit and then emptied at the coater. Depending on the particulate material, the covers (12) can be used again to protect against vaporisation and/or oxidation. Depending on the process status of the production system, it is possible to have a control unit intermittently switch on the motors (13) of the drive chain.

As shown in FIG. 5, it may be equally preferable to use a conveyor belt (14) as a supply means in terms of material transport. The particulate material is preferably transported close to the enclosing walls/barriers (15) in order to minimize atmospheric contact. Frictional effects are also present here, however, they are low compared to those associated with spiral conveyors. Here it is also possible to have a control unit intermittently switch on the motors (13) of the drive chain, depending on the process status of the production system.

DESIGNATION LIST

1 Support frame
2 Positioning units in X direction
3 Coater
4 Print head
5 Positioning unit in Z direction
6 Lifting device
7 Conveying crucible
8 Receiving container
9 Silo/mixer unit
10 Troughs
11 Chain
12 Cover
13 Motors
14 Conveyor belt
15 Barriers

What is claimed is:

1. A method for manufacturing three-dimensional models using a 3D printing process comprising the steps of:
   a) transporting a first amount of a particulate material from a stationary material storage device to a first vertical position using a material feeding device for delivering the particulate material to a receiving container that is attached to a support frame so that the receiving container moves with the support frame in a vertical direction;
   b) filling a dosing unit on the support frame with the particulate material in the receiving container:
   c) depositing one or more layers of the particle material from the dosing unit onto a stationary build platform;
   d) elevating the support frame, the dosing unit, and the receiving container in the vertical direction after depositing each layer of the particulate material by one particle layer thickness; and
   e) transporting a second amount of the particulate material from the material storage device to a second vertical position using the material feeding device for delivering the particulate material to the receiving container, wherein the second vertical position is offset from the first vertical position;
   wherein the method includes mixing the particulate material with a liquid prior to transporting the particulate material from the material storage device.

2. The method of claim 1, wherein the dosing device is a coater device that moves over the build platform in a horizontal direction.

3. The method of claim 2, wherein the material feeding device includes a lifting device having a linear actuator.

4. The method of claim 3, wherein the material feeding device includes a crucible and the particulate material is transported from the material storage device to the receiving container in the crucible.

5. The method of claim 1, wherein the process avoids a generation of frictional heat during the transport of the particulate material from the material storage device to the receiving container.

6. The method of claim 1, wherein during the step of transporting the particulate material with the material feeding device, the particulate material is at least partially covered so that evaporation of the liquid is reduced or eliminated.

7. The method of claim 1, wherein high air currents of a pneumatic conveyor are avoided during the transport of the particulate material from the material storage device to the receiving container.

8. The method of claim 1, wherein the material feeding device includes one or more covered crucibles for transporting the mixture of the particulate material and the liquid.

9. The method of claim 1, wherein the method includes preparing multiple batches of a mixture of the particulate material and the liquid.

10. The method of claim 1, wherein the liquid is a hardening material.

11. A method for manufacturing three-dimensional models using a 3D printing process comprising the steps of:
   a) transporting a first amount of a particulate material from a stationary material storage device to a first vertical position using a material feeding device for delivering the particulate material to a receiving container that is attached to a support frame so that the receiving container moves with the support frame in a vertical direction;
   b) filling a dosing unit on the support frame with the particulate material in the receiving container;
   c) depositing one or more layers of the particle material from the dosing unit onto a stationary build platform;
   d) elevating the support frame, the dosing unit, and the receiving container in the vertical direction after depositing each layer of the particulate material by one particle layer thickness; and
   e) transporting a second amount of the particulate material from the material storage device to a second vertical position using the material feeding device for delivering the particulate material to the receiving container, wherein the second vertical position is offset from the first vertical position;
   wherein the dosing device is a coater device that moves over the build platform in a horizontal direction;
   the particulate material being transported by the material feeding device includes many individual particles, wherein the many individual particles generally move together at the same instantaneous velocity, and
   the many individual particles are supported by one or more surfaces of the material feeding device and move with the support surface at the same instantaneous velocity.

12. A method for manufacturing three-dimensional models using a 3D printing process comprising the steps of:
   a) transporting a first amount of a particulate material from a stationary material storage device to a first vertical position using a material feeding device for delivering the particulate material to a receiving container that is attached to a support frame so that the receiving container moves with the support frame in a vertical direction;

b) filling a dosing unit on the support frame with the particulate material in the receiving container;

c) depositing one or more layers of the particle material from the dosing unit onto a stationary build platform;

d) elevating the support frame, the dosing unit, and the receiving container in the vertical direction after depositing each layer of the particulate material by one particle layer thickness; and e) transporting a second amount of the particulate material from the material storage device to a second vertical position using the material feeding device for delivering the particulate material to the receiving container, wherein the second vertical position is offset from the first vertical position;

wherein the dosing device is a coater device that moves over the build platform in a horizontal direction; and wherein the particulate material is mixed with a liquid medium prior to being deposited as a layer over the build surface.

13. A method for manufacturing three-dimensional models using a 3D printing process comprising the steps of:

a) transporting a first amount of a particulate material from a stationary material storage device to a first vertical position using a material feeding device for delivering the particulate material to a receiving container that is attached to a support frame so that the receiving container moves with the support frame in a vertical direction;

b) filling a dosing unit on the support frame with the particulate material in the receiving container;

c) depositing one or more layers of the particle material from the dosing unit onto a stationary build platform;

d) elevating the support frame, the dosing unit, and the receiving container in the vertical direction after depositing each layer of the particulate material by one particle layer thickness; and e) transporting a second amount of the particulate material from the material storage device to a second vertical position using the material feeding device for delivering the particulate material to the receiving container, wherein the second vertical position is offset from the first vertical position;

wherein the dosing device is a coater device that moves over the build platform in a horizontal direction; and wherein the material feeding device has an incline angle, wherein the incline angle changes as the vertical position of the coater device is changed.

14. The method of claim 13, wherein the method includes selectively dropping a liquid binder material over a deposited layer of particulate material.

15. The method of claim 13, wherein the particulate material being transported by the material feeding device includes many individual particles, wherein the many individual particles generally move together at the same instantaneous velocity.

16. The method of claim 13, wherein the material feeding device includes a conveyor belt.

17. The method of claim 13, wherein the material feeding device includes a chain trough conveyor.

18. The method of claim 13, wherein the method includes repeatedly layerwise depositing the particulate material onto the build surface and selectively printing a binder material onto the layer of the particulate material until the three-dimensional models are a 3D article is printed.

19. The method of claim 18, wherein the method includes removing loose particulate material from the three-dimensional models.

20. The method of claim 13, wherein the dosing device is a coater device that moves over the build platform in a horizontal direction.

21. The method of claim 20, wherein the particulate material being transported by the material feeding device includes many individual particles, wherein the many individual particles generally move together at the same instantaneous velocity.

22. The method of claim 13, wherein the particulate material is mixed with a liquid medium prior to being deposited as a layer over the build surface.

* * * * *